US008835343B2

(12) United States Patent
Liu et al.

(10) Patent No.: US 8,835,343 B2
(45) Date of Patent: Sep. 16, 2014

(54) NON-PLATINUM GROUP METAL ELECTROCATALYSTS USING METAL ORGANIC FRAMEWORK MATERIALS AND METHOD OF PREPARATION

(75) Inventors: Di-Jia Liu, Naperville, IL (US);
Shengqian Ma, Tampa, FL (US);
Gabriel A. Goenaga, New York, NY (US)

(73) Assignee: UChicago Argonne, LLC, Chicago, IL (US)

( * ) Notice: Subject to any disclaimer, the term of this patent is extended or adjusted under 35 U.S.C. 154(b) by 571 days.

(21) Appl. No.: 12/891,509

(22) Filed: Sep. 27, 2010

(65) Prior Publication Data

US 2012/0077667 A1 Mar. 29, 2012

(51) Int. Cl.
*H01M 4/88* (2006.01)
*B01J 31/12* (2006.01)
*H01M 4/86* (2006.01)
*H01M 4/90* (2006.01)

(52) U.S. Cl.
CPC .......... *H01M 4/8605* (2013.01); *H01M 4/9041* (2013.01); *H01M 4/8882* (2013.01); *H01M 4/8875* (2013.01); *Y02E 60/50* (2013.01)
USPC ........... 502/101; 502/165; 502/167; 502/200; 502/305; 502/308; 502/315; 502/316; 502/324; 502/326

(58) Field of Classification Search
CPC ............ H01M 4/8605; H01M 4/8875; H01M 4/8882; H01M 4/92; H01M 4/9041
USPC .................. 502/101, 165, 167, 200, 324, 326
See application file for complete search history.

(56) References Cited

U.S. PATENT DOCUMENTS

| 7,507,690 | B2 | 3/2009 | Krumpelt et al. | |
| 7,550,223 | B2 | 6/2009 | Zelenay et al. | |
| 2004/0204315 | A1 | 10/2004 | Krumpelt et al. | |
| 2009/0023828 | A1 | 1/2009 | Yu et al. | |
| 2010/0043636 | A1* | 2/2010 | Hwang et al. | 95/127 |
| 2011/0137025 | A1* | 6/2011 | Yaghi et al. | 540/145 |
| 2011/0294658 | A1* | 12/2011 | Lefevre et al. | 502/185 |

OTHER PUBLICATIONS

Machine translation of Ikura(JP2007-277105).*
Wu et al., "Polyaniline-derived Non-Precious Catalyst for the Polymer Electrolyte Fuel Cell Cathode", *ECS Transactions*, 16(2) pp. 159-170 (2008), The Electrochemical Society.
Ma et al., "Cobalt Imidazolate Framework as Precursor for Oxygen Reduction Reaction Electrocatalyst", *DOI*, 10 1002/anie.200, pp. 1-16.
Van Veen et al., "Oxygen Reduction on Monomeric Transition Metal Phthalocyanines in Acid Electrolyte", *Electrochimica Acta*, vol. 24, pp. 921-928, (1979) Pergamon Press Ltd., Great Britain.

(Continued)

*Primary Examiner* — Jun Li
(74) *Attorney, Agent, or Firm* — Foley & Lardner LLP

(57) ABSTRACT

A method of preparing a nitrogen containing electrode catalyst by converting a high surface area metal-organic framework (MOF) material free of platinum group metals that includes a transition metal, an organic ligand, and an organic solvent via a high temperature thermal treatment to form catalytic active sites in the MOF. At least a portion of the contained organic solvent may be replaced with a nitrogen containing organic solvent or an organometallic compound or a transition metal salt to enhance catalytic performance. The electrode catalysts may be used in various electrochemical systems, including a proton exchange membrane fuel cell.

15 Claims, 16 Drawing Sheets

(56) References Cited

OTHER PUBLICATIONS

Lefevre et al., "Iron-Based Catalysts with Improved Oxygen Reduction Activity in Polymer Electrolyte Fuel Cells", *Science*, Apr. 3, 2009, pp. 71-74, vol. 324, www.sciencemag.org.

Ma et al., Framework-catenation Isomerism in Metal—Organic Frameworks and Its Impact on Hydrogen Uptake, *JACS Communications*, (2007), pp. 1858-1859, vol. 129, American Chemical Society.

Faubert et al., "Activation and Characterization of Fe-Based Catalysts for the Reduction of Oxygen in Polymer Electrolyte Fuel Cells", *Electrochimica Acta*, (1998), pp. 1969-1984, vol. 43, Elsevier Science Ltd.

Lefevre et al., "Fe-Based Catalysts for the Reduction of Oxygen in Polymer Electrolyte Membrane Fuel Cell Conditions: Determination of the Amount of Peroxide Released During Electroreduction and its Influence on the Stability of the Catalysts", *Electrochimica Acta*, (2003), pp. 2749-2760, vol. 48, Elsevier Science Ltd.

Jaouen et al., "Cross-Laboratory Experimental Study of Non-Noble-Metal Electrocatalysts for the Oxygen Reduction Reaction", *Applied Materials & Interfaces*, (2009), pp. 1623-1639, vol. 1, No. 8, American Chemical Society.

Jasinski, Raymond, "A New Fuel Cell Cathode Catalyst", *Nature*, Mar. 21, 1964, pp. 1212-1213, vol. 201, Nature Publishing Group.

\* cited by examiner

Ex. 3, solid circles; Ex. 4, hollow circles; Ex. 5 solid triangles; Ex. 6, hollow triangles; Ex. 1, solid squares.

Ex. 3, solid circles; Ex. 4, hollow circles; Ex. 5 solid triangles; Ex. 6, hollow triangles; Ex. 1, solid squares.

Example 1, solid circles; Example 8, hollow circles;

Example 1, solid circles; Example 8, hollow circles;

US 8,835,343 B2

NON-PLATINUM GROUP METAL ELECTROCATALYSTS USING METAL ORGANIC FRAMEWORK MATERIALS AND METHOD OF PREPARATION

GOVERNMENT INTEREST

The United States Government has rights in this invention pursuant to Contract No. DE-AC02-06CH11357 between the United States Government and the UChicago Argonne, LLC, representing Argonne National Laboratory.

FIELD OF THE INVENTION

This invention pertains to electrocatalysts for use in fuel cells. More specifically this invention relates to electrocatalysts for use in fuel cells which do not contain platinum or other platinum group metals and methods of preparing such electrocatalysts using metal-organic framework materials.

BACKGROUND

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A fuel cell is an effective device for converting chemical energy to electrical energy through electro-catalytic reactions. The proton exchange membrane fuel cell (PEMFC) operates at a relatively low temperature with the gas phase hydrogen as fuel and oxygen (air) as oxidant. At the core of a PEMFC is the membrane electrode assembly (MEA) which includes an anode, a cathode, and a polymer electrolyte layer in between. Because of its relatively high conversion efficiency, low noise and low emissions, the PEMFC is deemed to have substantial potential for use in a variety of applications, including automobiles and distributed power generation.

At present, generally the most effective catalyst for electrocatalytic reactions utilizes a platinum (Pt) electrode catalyst supported on an amorphous carbon substrate. A typical Pt loading on the MEA surface ranges from about 0.2 mg/cm$^2$ to about 0.4 mg/cm$^2$. Because platinum is a precious metal with limited supply, its use as a catalyst adds a significant cost to a PEMFC system. Other platinum group metals (PGMs), such as Pd, Rh, Ru, etc., are being evaluated as a possible replacement for Pt. However, PGMs also generally suffer from high cost and limited reserves. As such, the use of PGMs in electrochemical devices such as a fuel cell typically adds significant cost to the system and represents a major barrier to commercialization.

Various attempts have been made to replace PGMs in fuel cells. These attempts have been mainly focused on developing replacement materials utilizing transition metal compounds. For example, it is known that molecules containing a macrocyclic structure with an iron or cobalt ion coordinated by nitrogen from the four surrounding pyrrolic rings has catalytic activity toward capture and reduction of molecular oxygen. Additionally, oxygen reduction reaction (ORR) catalytic activity can be improved for systems containing coordinated FeN$_4$ and CoN$_4$ macrocycles through heat treatment. Examples of a macro-molecular system containing FeN$_4$ and CoN$_4$ moieties include corresponding transitional metal phthalocyanine and porphyrin.

Methods of preparing non-PGM catalyst by incorporating a transition metal into heteroatomic polymers in a polymer/carbon composite are also known. Additionally, good ORR activity can be achieved by mixing amorphous carbon based catalyst with FeN$_4$ group and carbonaceous material or synthetic carbon support, followed by high temperature treatment in a gas mixture of ammonia, hydrogen and argon. An iron salt adsorbed on carbon in the presence of a nitrogen precursor can also produce a catalyst with good ORR activity. However, such catalyst material will generally decompose under acidic conditions to release iron, and thus is unstable for the electro-catalytic reaction within a fuel cell cathode. Additionally, because carbon does not carry the electrocatalytic activity by itself, using a carbon support dilutes the catalytic active site and results in inhomogeneous active site distribution in the final catalyst materials thus prepared.

In light of these considerations, there is a need to develop a low cost alternative to PGMs as the electrode catalyst for fuel cells and similar electrocatalytic applications.

SUMMARY

The present invention relates to electrode catalysts and methods of preparing electrode catalysts that may be used in an oxygen reduction reaction (ORR). The present electrode catalysts contain mainly transition metals, carbon and nitrogen but are free of precious group metals (PGMs). The electrode catalysts prepared according to the present invention have several advantages over various conventional electrocatalyst materials, including a high surface area, high active site density, uniform site distribution, and ease of chemical exchange. Additionally, the catalytic activity of the electrocatalyst materials can be further enhanced when heat treated in the presence of various chemicals.

Various embodiments of the present invention provide multi-step methods for the synthesis of metal-organic framework (MOF) materials containing at least one non-PGM transition metal and organic ligands with or without nitrogen-containing functional groups. Various embodiments optionally add at least one transition metal into the porous structure of the MOF material through a solvent exchange. Still other embodiments include heat-treating the prepared MOF materials at an elevated temperature in the presence of ammonia or other nitrogen-containing chemicals. Yet other embodiments optionally further treat the prepared MOF material with an acid to remove excess metal. Additional embodiments optionally further treat the prepared MOF material at elevated temperatures under an inert gas.

In various embodiments, the present invention presents electrocatalyst materials and processes for preparing such materials that may serve as a low-cost replacement for current materials that generally rely on expensive precious metals. Thus, an objective of the present invention is to provide a method of making the electrocatalyst using relatively inexpensive transition metals and nitrogen containing organic molecules. Such electrode catalysts can be used as a fuel cell cathode, reducing or removing a cost barrier to fuel cell commercialization. Such materials can also potentially be used for other electrochemical applications where an ORR process is utilized, including, for example, as cathode material for a Li-Air battery.

Another aspect of various embodiments of the present invention is to prepare various MOF materials that include an organic solvent within the framework as a precursor for a non-PGM catalyst. Organic solvents may be used in synthesizing the MOF material. Due to the high porosity and periodic cavities present within the MOF crystals, the solvent used for MOF synthesis can often be trapped or encapsulated inside of the MOF cavity. During a heat-treatment process, a fraction of the solvent will react with the MOF host and decompose before the solvent can escape. The addition of organic material through such a method can facilitate the formation of catalyst by adding carbon, nitrogen and other elements relevant to the final catalyst structure. Therefore, the solvent containing MOF material can also be used as a precursor for non-PGM catalyst preparation according to various embodiments of the present invention. In a preferred embodiment, the solvents used for MOF synthesis contain nitrogen in the molecular structure. Optionally, other organic solvents can also be used when nitrogen containing ligands are present in the MOF material.

Yet another aspect of various embodiments of the present invention is to exchange a first solvent contained within the MOF during the synthesis of the MOF with a second solvent after the MOF is formed and isolated. The porous structure of MOF material makes it relatively easy to remove and exchange a solvent through various physical and chemical paths. The second solvent can have a different molecular structure and/or composition in relation to the first solvent, which are more favorable for the formation of catalytic sites during the heat-treatment process according to embodiments of the present invention.

Still another aspect of various embodiments of the present invention is to substitute or exchange a solvent contained within the MOF during the synthesis of the MOF with a transition metal organometallic compound after the MOF is formed. The porous structure of MOF material makes it relative easy to remove the solvent through various physical and chemical paths. The organometallic compound and soluble metal salts can be prepared in solution phase and subsequently exchanged into the porous structure of the MOF and replace the pre-existing solvent. The metals in the organometallic compounds and/or metal salts can be the same or different from those used as the secondary building unit (SBU) in the MOF preparation. The transition metal organometallic compounds can react with the MOF during the heat-treatment process to form the catalytic active sites with different structure and density, leading to improved catalytic activity.

Another aspect of various embodiments of the present invention is to activate the MOF materials thus prepared through thermal treatment of the precursors via, for example, pyrolysis in an inert or reducing atmosphere. The thermal treatment leads to decomposition and reaction between different components of the MOF precursor and formation of the catalytic active sites. The thermal activation process also improves the electrical conductivity of the material, a beneficial feature for an electrocatalyst.

Yet another aspect of various embodiments of the present invention is to further process thermally treated MOFs with one or more post-treatment processes, including an acid wash, ball milling and a second thermal treatment in an inert gas or in the presence of ammonia. The post-treatment processes can further enhance the catalytic activity of the material.

These and other objects, advantages, and features of the invention, together with the organization and manner of operation therefore, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
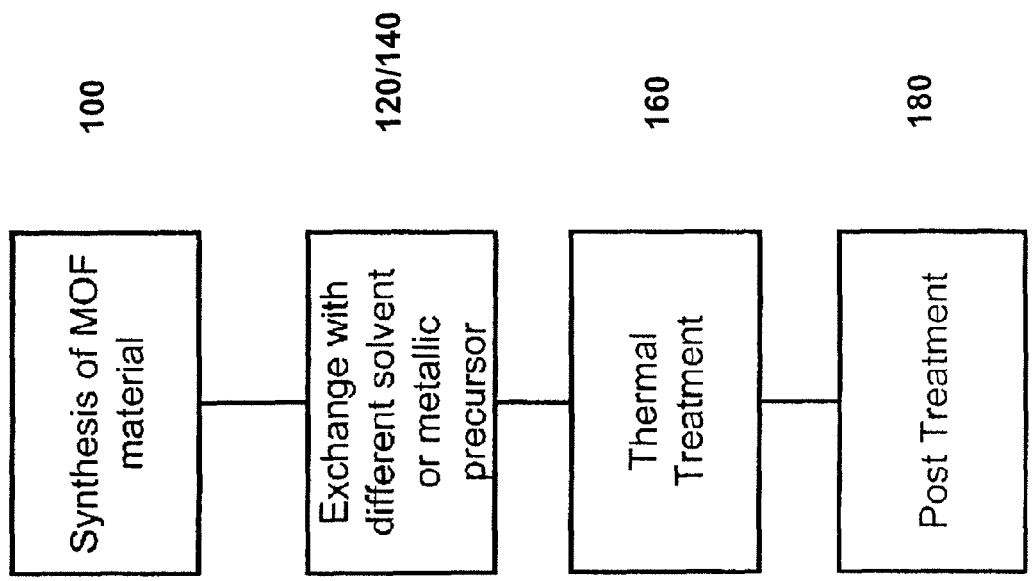
FIG. 1 is a schematic depicting a process flow for preparing non-PGM catalyst using metal organic framework materials as a precursor in accordance with an embodiment of the present invention.

According to various embodiments, non-PGM electrode catalysts are prepared using thermally treated transition metal-organic framework materials (MOFs). The prepared catalyst materials are characterized by various advantages applicable to electro-catalytic reactions, including a proton exchange membrane fuel cell (PEMFC) and in particular the electrodes of the membrane electrode assembly (MEA). At the core of a PEMFC is the MEA, which comprises an anode, a cathode and a polymer electrolyte layer in between. At the surface of the anode, hydrogen is oxidized through the electrocatalytic process described by Equation 1.

$$H_2 \rightarrow 2H^+ + 2e^- \tag{1}$$

The protons thus produced are transported to the cathode side through the proton conductive membrane. At the surface of the cathode, oxygen is electro-catalytically reduced and subsequently reacts with protons from the Equation (1) to form water.

$$O_2 + 4e^- + 4H^+ \rightarrow 2H_2O \tag{2}$$

The reaction described in Equation 2 is also known as the oxygen reduction reaction (ORR). In general, the cathodic oxygen reduction reaction, such as that described by Equation 2, typically occurs at a platinum surface of an electrocatalyst. Molecular oxygen is first adsorbed on the Pt active site and is subsequently converted to water by capturing four electrons and reacting with four protons. Few catalyst materials have a comparable catalytic efficiency as that of platinum for the ORR. Those materials with similar catalytic activity usually belong to the precious group metals (PGM), such as Pd, Rh, Ir, Ru, etc., in addition to Pt. Accordingly, an aspect of various embodiments of the present invention is to prepare porous MOF materials that may be used as precursors for preparing non-PGM catalyst materials useful in the above reaction and applicable to various electrochemical applications.

MOF materials may be prepared according to the present invention using non-PGM transition metals that can serve as the catalytic centers. The applicable transition metals include Co, Fe, Ni, Cr, Cu, Mn, Ta, W, etc. Organic ligands are also utilized by converting the ligands as part of the catalyst structure through a thermal treatment process. In various embodiments, the organic ligands contain nitrogen within their molecular structure and include imidazolate, pyrazolate, tetrazolate, etc. Optionally, non-nitrogen containing organic ligands can also be used in synthesis of MOF materials that may be used as a precursor for electrocatalyst preparation. In addition to organic ligands, an optional templating agent may also be used for MOF synthesis. In one embodiment, the templating agent is piperazine. The solvents used in the MOF synthesis may also contribute as part of catalyst structure through a thermal treatment process. In various embodiments, the solvents contain nitrogen within their molecular structures and include dimethylformamide (DMF), diethylormamide (DEF), dimethylacetamide (DMA), pyridine, etc. Optionally, non-nitrogen containing solvents can also be used in synthesis of MOF materials that may be used as a precursor for electrocatalyst preparation.

In various embodiments, non-PGM electrode catalysts using thermally treated non-PGM transition metal MOF materials may be prepared according to the process depicted in FIG. 1. In particular, a non-PGM transition metal based MOF material is prepared using a chemical synthesis technique 100. The MOFs are produced through reaction between transition metal ions and organic ligands to form crystals with well-defined three-dimensional structures which are subsequently precipitated and separated from the solution. One commonly used synthesis technique is the solvothermal reaction in which a transition metal salt in the form of a nitrate, acetate, etc., is mixed with multidentate organic ligands in a solution containing an organic solvent. However, other techniques may also be applied. The MOF material produced during the synthesis 100 undergoes a thermal treatment 160 at an elevated temperature in an inert atmosphere, e.g., Ar or $N_2$, or in a reactive environment under a nitrogen containing gas such as $NH_3$, pyridine, acetonitrile, etc. The thermal treatment 160 also carbonizes at least a portion of the MOF material.

Optionally, between the synthesis 100 and the thermal treatment 160, a solvent exchange 120 may be performed. The solvent exchange 120 substitutes or replaces at least a portion of a first solvent, which enters the MOF in the synthesis step 100, with a second solvent. The second solvent is generally selected to promote the formation of electrocatalytic active sites during the thermal treatment 200. For example, if both the organic ligand and the first solvent do not contain nitrogen, it is a preferred approach then to exchange the first solvent with a second, nitrogen containing solvent before the thermal activation step 200.

Another optional step between the synthesis step 100 and thermal treatment step 160, includes a solvent replacement 140 where the solvent that enters the MOF during the synthesis step 100 is substituted or replaced with a metallic compound. The metallic compound could either be dissolved in a solvent or exist in liquid form by itself. The solvent replacement step 140 allows one or more different transition metals to be incorporated into the MOF material. Accordingly, a bimetallic or multi-metallic electrocatalytic center is formed upon activation via the thermal treatment 160.

A post treatment 180 can be optionally performed after the thermal treatment 160. The post treatment 180 can comprise one or more processes, for example, an acid washing, a ball milling, a second heat-treatment, etc, as described in greater detail below. The post treatment 180 may be configured to further improve the electrocatalytic activity of the thermally treated material.

The electrode catalysts prepared according to the process depicted of FIG. 1 are characterized by a high specific surface area when measured by Brunauer-Emmett-Teller (BET) method. Although, MOF materials are generally a high surface area porous material, using the present processes, even after thermal treatment, which may be a high temperature treatment, a substantial fraction of the surface area can be maintained or even enhanced. As used herein, various embodiments of the MOF material and the prepared electrode catalysts may have a high specific BET surface area of between about 100 $m^2/g$ and about 3000 $m^2/g$. In still other embodiments, the high specific BET surface area MOF material and the electrode catalysts have a surface area of between about 200 $m^2/g$ and about 1000 $m^2/g$. A high surface area enables exposure of catalytic active sites to reactants under various applications, including fuel cell applications, thereby enhancing catalytic reaction performance.

The present electrode catalysts may further be characterized by high active site density. In general, MOF materials are built upon crystalline structures with a transition metal as the secondary building unit (SBU) that is coordinated by multidentate organic ligands. A high transition metal (M) to nitrogen (N) and carbon (C) atomic ratio (M/N/C), for example, a M/N/C between about 1/4/6 and about 1/4/100, can yield a greater number of catalyst sites per unit volume of the MOF. For example, in various embodiments, electrode catalysts of the present invention are characterized by a catalytic active site density of between about $10^{19}/cm^3$ and about $4 \times 10^{21}/cm^3$. The improved ratio can be achieved when the MOF material is used as an initial, i.e., precursor material, for non-PGM catalyst preparation. Still another characteristic of the electrode catalysts is uniform catalyst site distribution. The MOF material typically exhibits a well defined crystal structure with the transition metals and organic ligands evenly distributed throughout the framework. This well defined structure leads to uniformly distributed catalyst sites after the thermal treatment process.

Yet another attribute of the present electrode catalysts is ease of chemical exchange. For example, the catalytic activity of a material can be further enhanced when heat-treated in the presence of other chemicals such as a precursor of another transition metal or another nitrogen containing organic compound. Because MOFs have a high fraction of pores with uniformly distributed cavities, this void space can accommodate different precursors such as one or more transition metals or a nitrogen containing organic compound via an efficient chemical processes such as solvent exchange. The added entities are also in immediate proximity of the transition metal SBU for effective formation of the catalytic active sites during the thermal treatment process.

The process depicted in FIG. 1 will now be described in further detail. In step 100, synthesizing or preparing the MOF based precursor, a number of general methods of synthesis of MOF materials of various structures and compositions may be applied. A commonly used technique is the solvothermal reaction, which may be utilized in the synthesis step 100 as generally illustrated below.

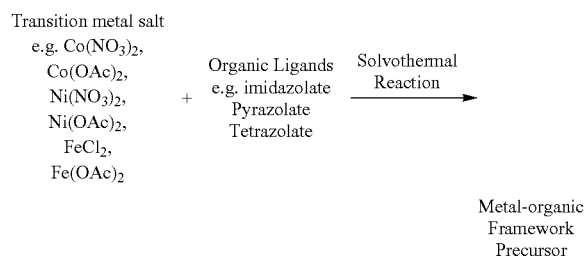

Specifically, as used in the synthesis step 100, a transition metal salt such as a nitrate, an acetate, a chloride, etc. is first dissolved in an organic solvent solution. Various examples of the transition metal salts include, but are not limited to, $Co(NO_3)_2$, $Co(OAc)_2$, $Ni(NO_3)_2$, $Ni(OAc)_2$, $FeCl_2$, $Fe(OAc)_2$, etc. The concentration of the metal solution typically ranges from about 0.1 mol/L to about 1.0 mol/L. More preferably, the concentration of the metal solution typically ranges from about 0.3 mol/L to about 0.4 mol/L.

Figure 2:
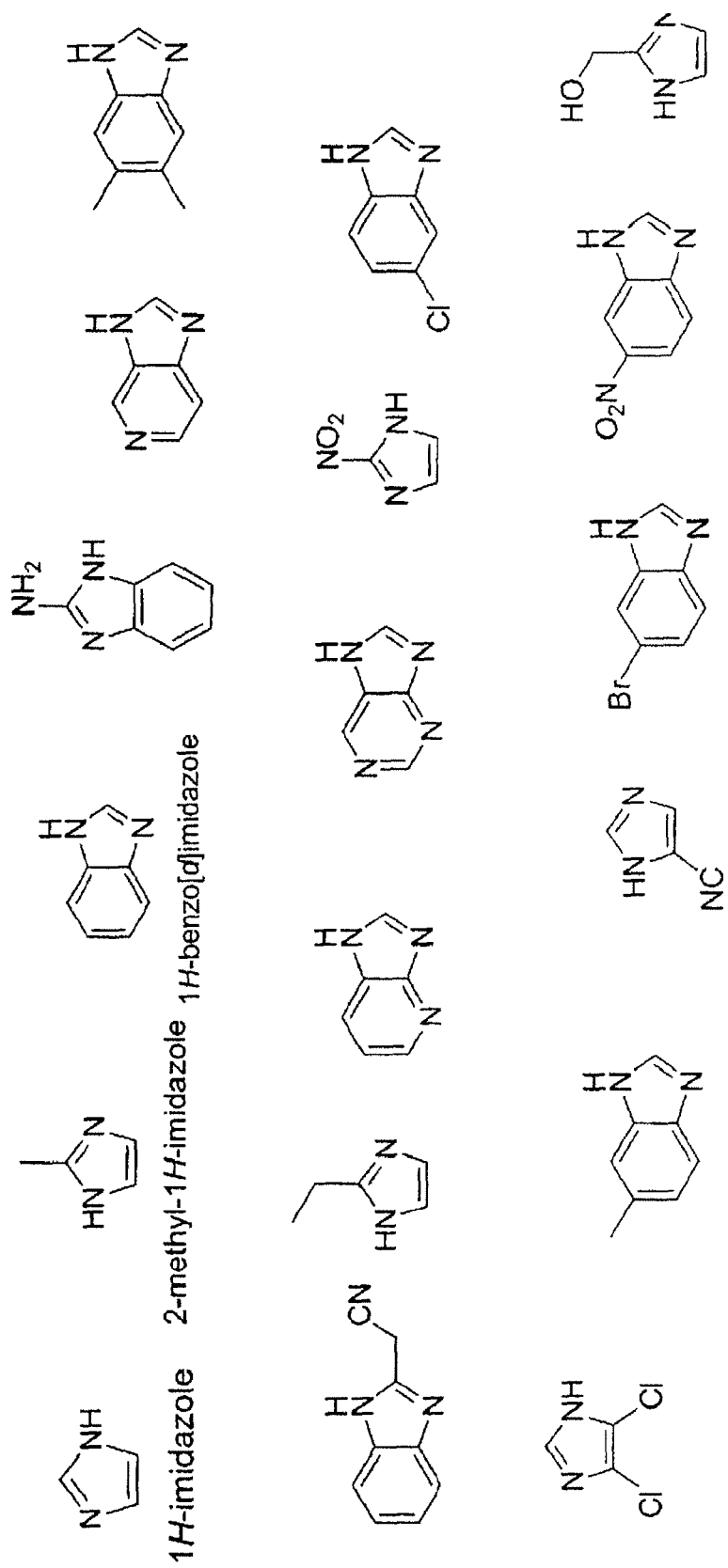
FIG. 2 is a schematic of molecular structures of selected imidazolate ligands for the preparation of transition metal containing metal organic framework materials according to the process of FIG. 1.
Figure 3:
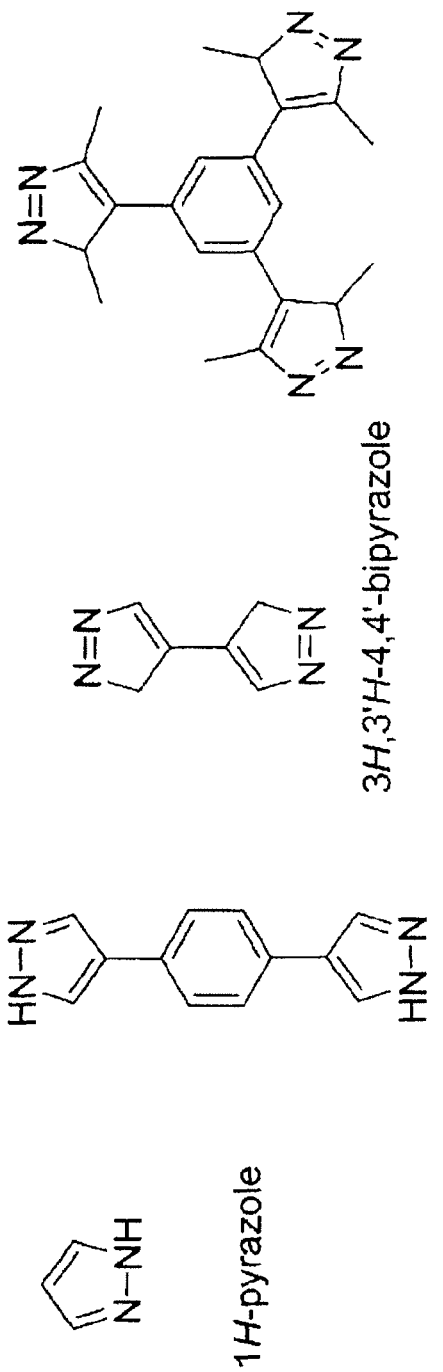
FIG. 3 is a schematic of molecular structures of selected pyrazolate ligands for the preparation of transition metal containing metal organic framework materials according to the process of FIG. 1.
Figure 4:
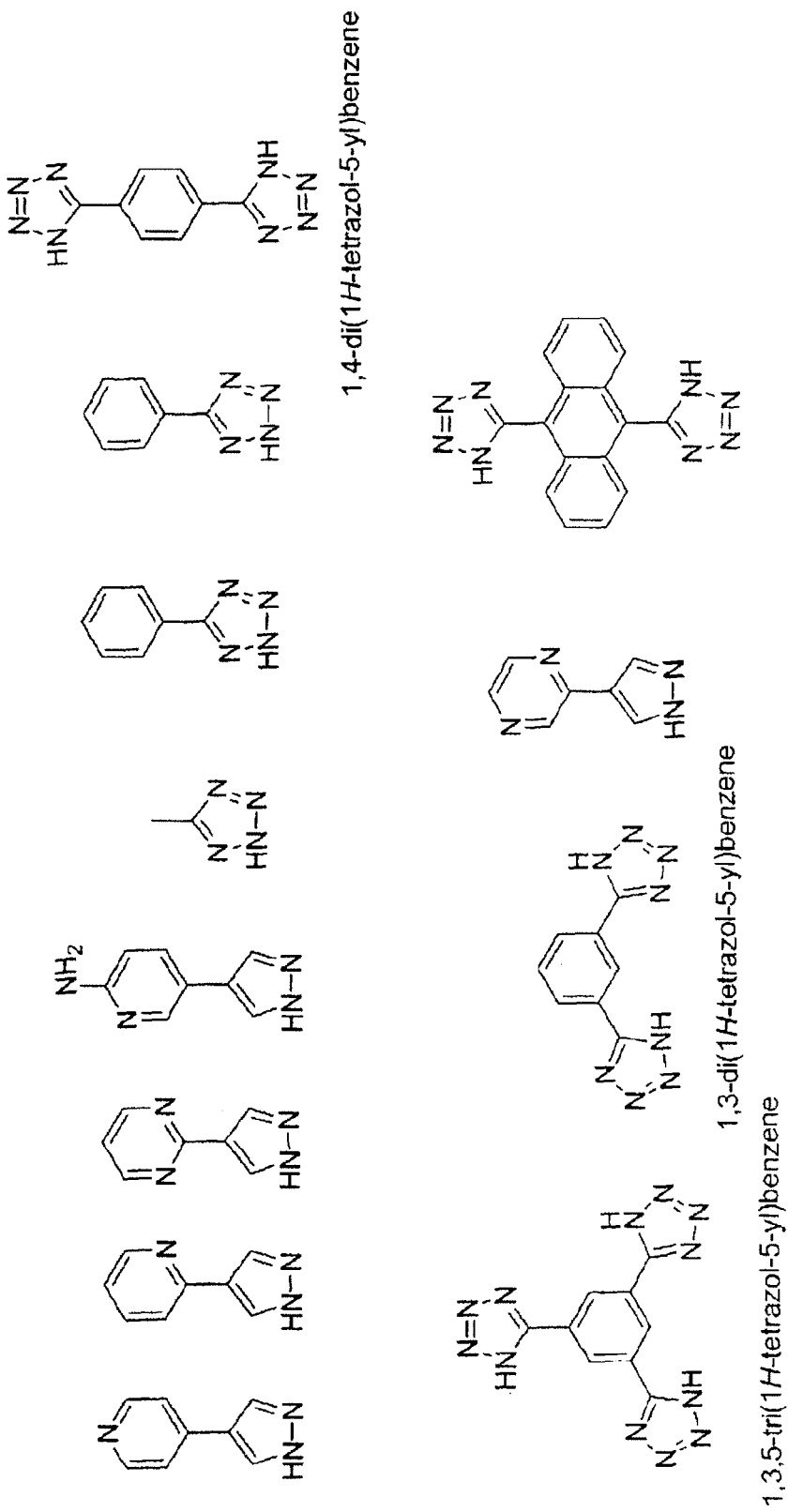
FIG. 4 is a schematic of molecular structures of selected tetrazolate ligands for the preparation of transition metal containing metal organic framework materials according to the process of FIG. 1.

The organic ligand is dissolved into the organic solvent to prepare the ligand solution, which may be performed in parallel with preparation of the metal solution. In various preferred embodiments, the organic ligands include the multidentate compounds containing nitrogen, such as imidazolate, pyrazolate, and tetrazolate ligands. The molecular structures of selected groups of compounds of the organic ligands are shown in FIG. 2 for imidazolate, FIG. 3 for pyrazolate, and FIG. 4 for tetrazolate. In a preferred embodiment, the imidazole compounds include 1H-imidazole, 2-methyl-1H-imidazole, 1H-benzo[d]imidazole, and the like. Optionally, organic ligands that do not contain nitrogen can also be used.

Various configurations of the MOF material may be prepared by modulating the concentration of the ligand. The concentration of the ligand in the solution is generally determined by the stoichiometric ratio to the metal content in the solution and the final composition of the MOF material. For example, if the final metal to ligand ratio in the MOF structure is 1:3, then the molar concentration of the ligand should be three times of that of the metal in the final mixture after the metal and ligand solutions are mixed.

The properties of the MOF material may also be adjusted through selection of the organic solvent used in preparing the ligand solution. A portion of the organic solvent is entrapped or contained within the MOF and can participate in the formation of the catalyst according to various embodiments, including thermal treatment. As described above, the organic solvent is the first solvent and in a preferred embodiment, the first solvent includes, but is not limited to, dimethylformamide (DMF), diethylormamide (DEF), dimethylacetamide (DMA), cynamide, pyridine, etc. In various embodiments, a templating agent may also be mixed in the solution for the preparation of the MOF. The templating agent serves as a coordination buffering ligand during the formation of the MOF and will be removed with the first solvent when the MOF precipitate is separated from the solution. In a preferred embodiment, the templating agent includes, but is not limited to, piperazine.

In the optional solvent exchange step 120, at least a portion of the first solvent contained within the MOF is replaced with or substituted by a second solvent. The MOF material contains uniformly distributed cavities that trap the first solvents at the end of the solvothermal reactions. The entrapped or contained solvents can participate in the reaction during the thermal conversion step by contributing to the formation of the catalytic active sites. The chemical composition of the solvent can be important to the nature of the active site. The solvent contained during the solvothermal reaction can generally be removed from the cavity using standard physical or chemical means known to those in the art, such as vacuum, vaporization through moderate temperature. As such, a second chemical moiety with a more preferred composition to form electrocatalytic active sites can be exchanged into the MOF cavities following removal of the first solvent.

Figure 5:
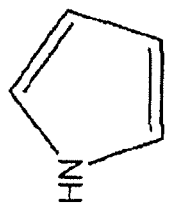
FIG. 5 is a schematic of molecular structures of selected solvents that can be used for solvent-exchange for the preparation of transition metal containing metal organic framework materials according to the process of FIG. 1.
Figure 5:
Figure 5:
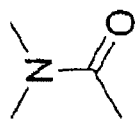
Figure 5:
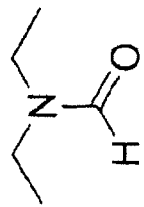
Figure 5:
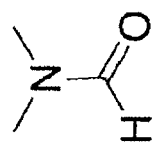
Figure 5:
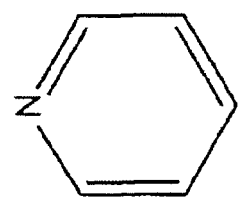

Alternatively, the first solvent can also be substituted or replaced by a second chemical moiety by immersing the MOF material obtained from the synthesis 100 directly into the second chemical moiety, a process known as solvent exchange. In one embodiment, the contained solvent inside the MOF material is exchanged with a second solvent or chemical moiety which will promote the formation of the catalytic active site within the MOF. In a preferred embodiment, such chemical moieties include dimethylformamide (DMF), diethylormamide (DEF), dimethylacetamide (DMA), cynamide, pyridine, etc. The molecular structures of several representative solvents are depicted in FIG. 5. In general, any nitrogen-containing organic molecules with dimensions that can be accommodated by the MOF cavity can also be used and be substituted into the MOF material. The solvent exchange can be performed by using various methods known to those in the art, such as: immersing, agitating, sonicating and refluxing in the second solvent.

In another embodiment, one or more organometallic complexes or soluble metal ions may replace the first solvent or chemical moiety in the solvent substitution or replacement step 140. The organometallic complexes or soluble metal ions available for exchange have dimensions that are compatible with the cavities in the MOF material. The metal of the organometallic compound can be same as that metal in the SBU. Alternatively, the metal is different from the metal used in SBU. Examples of various suitable organometallic compounds include ferrocene, cobaltocene, Prussian blue, etc. and soluble metal salts include iron nitrate, cobalt nitrate, iron acetate, cobalt acetate, tantalum chloride, etc. After the chemical moiety exchange or substitution, the MOF material can be subjected to the thermal treatment 160 and conversion.

In the thermal treatment 160, the MOF material prepared as described above is subjected to a high temperature treatment to achieve thermal conversion of the MOF. The thermal treatment 160 partially decomposes and carbonizes the MOF material. The thermal treatment 160 forms the catalytic active sites through the reaction of the metal center, the organic ligand and optionally the solvent trapped with the MOF cavities through pyrolysis. Additionally, the thermal treatment 160 improves the electron conductivity of the framework materials by partially carbonizing the organic ligands so that a charge is more effectively transferred to and from the catalytic active site during the electrochemical reaction.

Figure 14B:
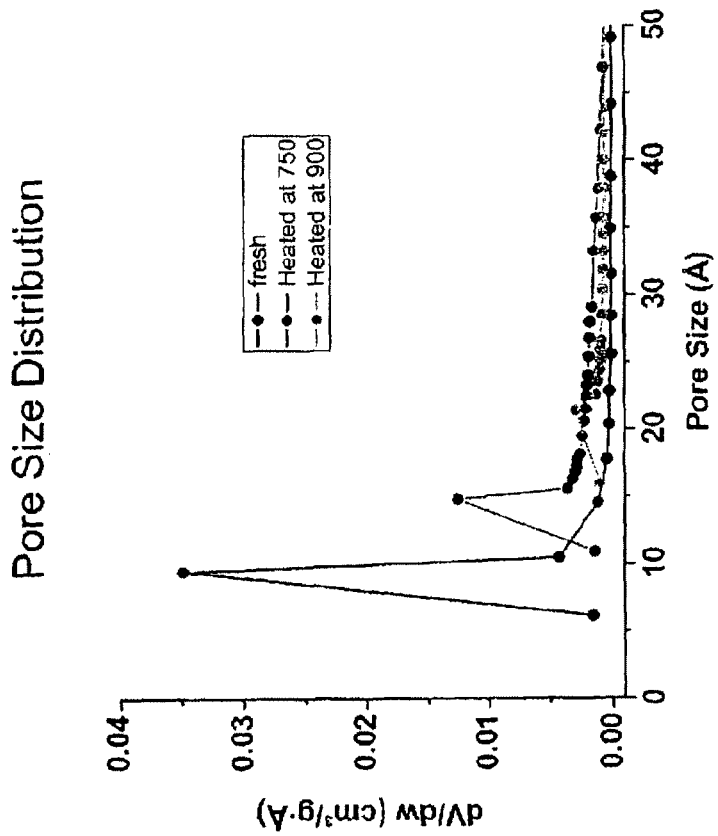
FIG. 14b is a plot of volume distributions of various pore diameters for a Co-containing MOF sample prepared according to Example 1 with no heat treatment and various heat treatment temperatures.
Figure 14A:
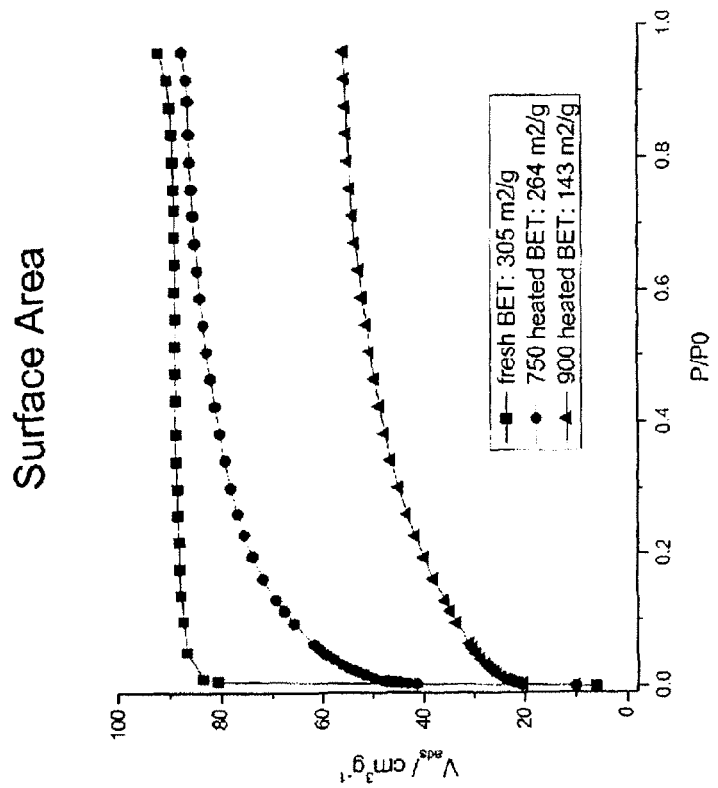
FIG. 14a is a plot of surface area of the nitrogen adsorption isotherm.

The high surface area of the MOF material is substantially maintained during the thermal treatment 160. FIG. 14a shows the nitrogen adsorption isotherm as the function of the reduced pressure (P/Po) and the resulting surface area for three MOF material samples, a freshly prepared cobalt containing MOF material and the same MOF material after heat treatment at 750° C. and 900° C. The samples were analyzed using the BET method with nitrogen as the adsorptive. FIG. 14b shows the fraction of pore volume as the function of pore size for all three samples. After thermal conversion at 750° C., the MOF material maintains more than 80% of the original surface area with an average pore diameter of 14.8 Å.

The thermal conversion of the MOF material is generally conducted in a controlled environment, such as a sealed reactor or a flow reactor surrounded by a heating element. In the preferred embodiment, the thermal treatment 160 is carried out inside of a tubular reactor under a constant flow of a carrier gas surrounded by a temperature controlled furnace. The thermal conversion temperature typically ranges from about 400° C. to about 1000° C. In a preferred embodiment, the thermal conversion temperature ranges from about 600° C. to about 900° C. In a more preferred embodiment, the high temperature thermal conversion temperature ranges from about 700° C. to about 800° C.

The time that the MOF material undergoes the thermal treatment 160 within the thermal conversion temperature range may be controlled and set to a predetermined duration. According to various embodiments, the thermal treatment time is between about 30 minutes to about 3 hours. In a preferred embodiment, the thermal treatment time is about 60 minutes to about 90 minutes. Additionally, the chemical composition of the carrier gas may be selected to achieve desired properties of the catalyst material. In various embodiments, the carrier gas is an inert gases such as Ar or He. However, in other embodiments, the carrier gas may be a semi-inert gas such as nitrogen. In still other embodiments, the carrier gas is reductive and contains nitrogen. Examples of reducing carrier gases include, but are not limited to, $NH_3$, pyridine, acetonitrile, etc.

Following the thermal treatment 160, the catalyst material may optionally undergo one or more post treatment processes 180. For example, in various embodiments, after thermal conversion, the material can be processed through a post-treatment step 180 to further improve the electrocatalytic activity of the material. According to one embodiment, the post-treatment process 180 can comprise an acid washing of the catalyst material. A variety of inorganic acids can be utilized to dissolve excess metals from the material, including metals that may be added during the solvent replacement step 140. This may be accomplished by immersing the thermally treated MOF material in the acid solution. Acid washing can be aided by the methods known to those in the art, such as sonication and agitation. In various embodiments the inorganic acid may include hydrochloric acid, sulfuric acid, nitrate acid, and other acids capable of dissolving metals. The concentration of the acid can be in the range of about 0.1 molar to an undiluted concentration. In a preferred embodiment, the concentration of the acid ranges from about 0.5 molar to about 2 molar. The acid treatment process may be performed under ambient conditions or at an elevated temperature. In various embodiments, the acid treatment process may be conducted at a temperature as high as 80° C. The acid treatment process time ranges from about 0.5 hour to about 72 hours.

According to another embodiment of the invention, the acid washed material can be further thermally treated at an elevated temperature. This secondary thermal treatment may be carried out under an inert gas flow, e.g., Ar, He, etc., a semi-inert gas, or under a reducing gas flow. Additionally, the secondary thermal treatment may be carried out under similar temperature conditions and the same or a similar carrier gas as described above with regard to the thermal treatment process 160. A secondary thermal treatment of the MOF following the acid washing can further improve the electrocatalytic activity of the material.

In still other embodiments, following the thermal treatment 160, additional or different post treatment processes 180 may be performed on the MOF alone or in combinations thereof. Examples of additional post treatment processes include, but are not limited to, ball milling and a second thermal treatment in an inert gas or in the presence of ammonia. For example, in various embodiments, the thermally treated MOF material can be re-treated with one or more nitrogen-containing solvents or transition metal organometallic compounds as described by the solvent exchange 120 and the solvent replacement 140 processes, respectively, which is followed by another thermal treatment according to the thermal treatment process 160.

EXAMPLES

The following non-limiting examples are presented to illustrate the present invention and to assist one of ordinary skill in making and using the same. The examples are not intended in any way to otherwise limit the scope of the invention.

Example 1

Figure 6:
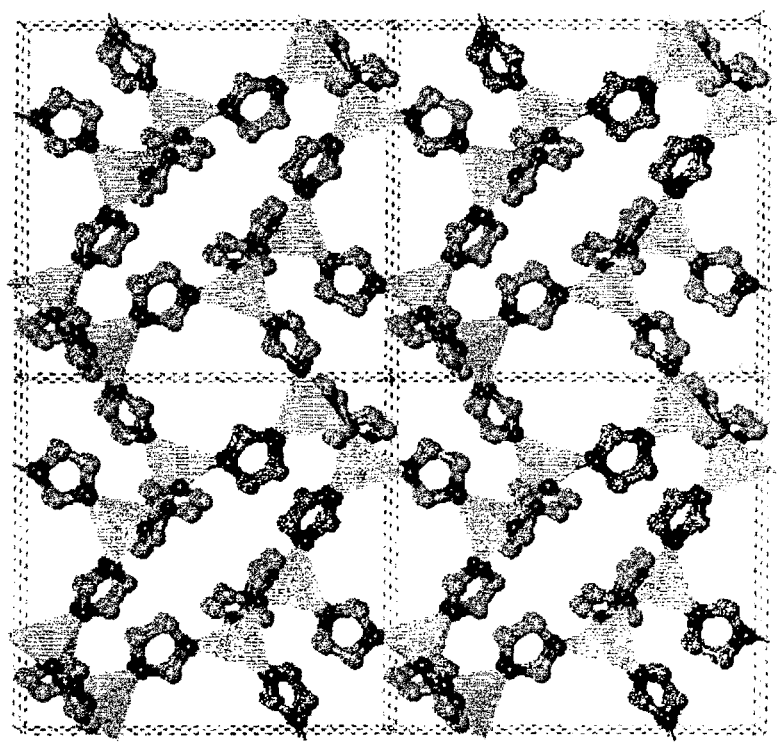
FIG. 6 is a schematic of the lattice structure of a Co-containing metal organic framework material prepared according to Example 1.

Procedure for preparing a Co-containing metal organic framework material. $Co(NO_3)_2 \cdot 4H_2O$ (3.115 g), imidazole (1.7 g), and piperazine as a templating agent (1.075 g) were added to dimethylacetamide (DMA) (65 mL). The reaction mixture was stirred at room temperature for 2 hours and then placed in a Teflon-lined autoclave (125 mL). The autoclave was sealed and heated to 130° C. with an increase of 1° C./min, and held at 135° C. for 24 hours. After cooling at a rate of 0.1° C./min to room temperature, violet prism crystals were collected and washed with 3×10 mL of DMA. The crystal structure was verified by X-ray diffraction, as shown in FIG. 6.

Example 2

Procedure for preparing a second Co-containing metal organic framework material. $Co(Ac)_2 \cdot 4H_2O$ (3.735 g, 15.0 mmol), imidazole (2.04 g, 30 mmol), and piperazine (1.29 g, 15 mmol) were added to dimethylacetamide (DMA) (75 mL). The reaction mixture was stirred at room temperature for 2 hours and then placed in a Teflon-lined autoclave (125 mL). The autoclave was sealed and heated to 130° C. with an increase of 1° C./min, and held at for 130° C. for 24 hours. After cooling at a rate of 0.1° C./min to room temperature, violet crystals were collected and washed with 3×10 mL of DMA.

Example 3

Figure 12B:
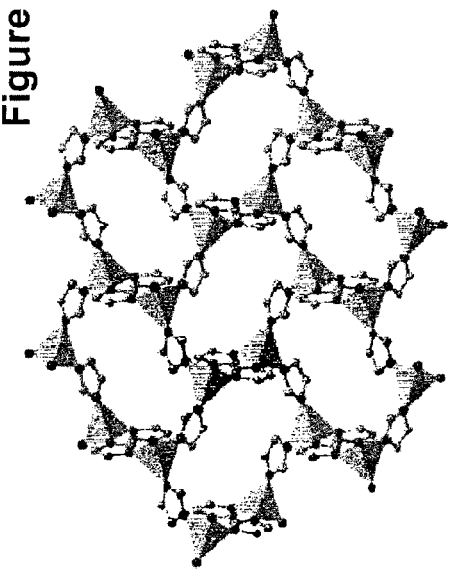
FIGS. 12a-12e are schematics of the lattice structure of Co-containing metal organic framework materials prepared according to Examples 8, 3, 4, 5 and 6, respectively.

Procedure for preparing a third Co-containing metal organic framework material. $Co(Ac)_2 \cdot 4H_2O$ (0.623 g, 2.5 mmol) was dissolved in pyridine (7.5 mL) and a solution of imidazole (0.34 g, 5 mmol) in 3-methyl-1-butanol (MB, 7.5 mL) was added. The mixture was stirred at room temperature for 2 hours to give a heterogeneous violet mixture which was then placed into a Teflon-lined autoclave (23 mL). The autoclave was sealed and heated to 140° C. with increasing rate of 1° C./min, and held at 140° C. for 24 hours. After cooling at a rate of 0.1° C./min to room temperature, violet crystals with a structure depicted in FIG. 12b were collected and washed with ethanol.

Example 4

Figure 12C:
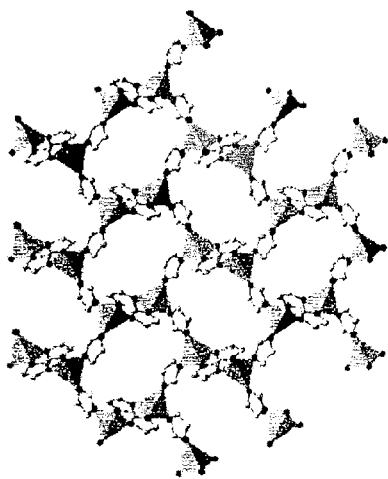

Procedure for preparing a fourth Co-containing metal organic framework material. $Co(Ac)_2 \cdot 4H_2O$ (0.623 g, 2.5 mmol) was dissolved in pyridine (7.5 mL) and a solution of imidazole (0.34 g, 5 mmol) in ethanol (10 mL) was added. The mixture was stirred at room temperature for 2 hours to give a heterogeneous violet mixture which was then placed into a Teflon-lined autoclave (23 mL). The autoclave was sealed and heated to 140° C. with increasing rate of 1° C./min, and held at 140° C. for 24 hours. After cooling at a rate of 0.1° C./min to room temperature, violet crystals with a structure depicted in FIG. 12c were collected and washed with ethanol.

Example 5

Figure 12A:
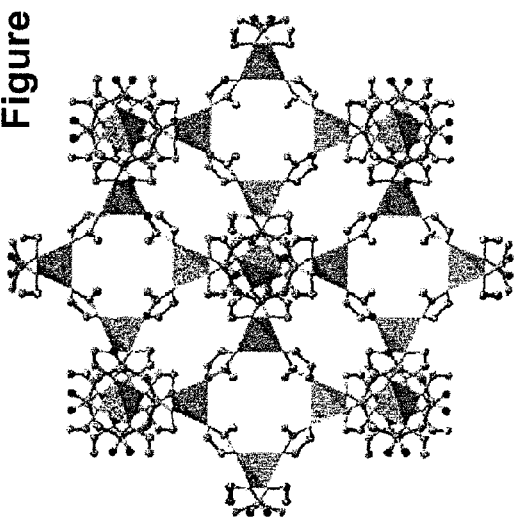
Figure 12E:
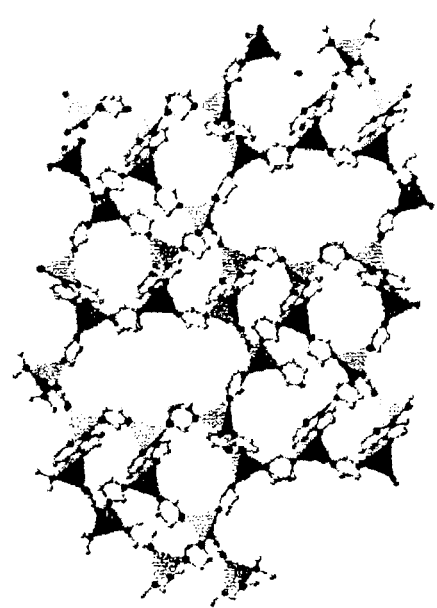
Figure 12D:
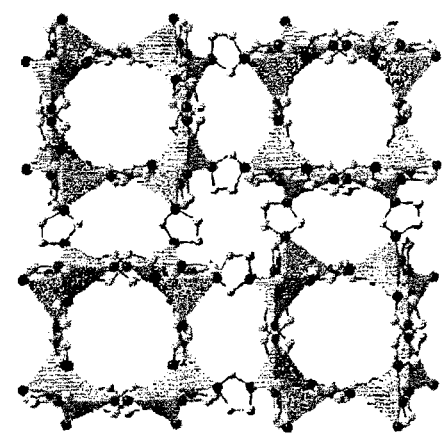

Procedure for preparing a fifth Co-containing metal organic framework material. $Co(Ac)_2 \cdot 4H_2O$ (0.623 g, 2.5 mmol) was dissolved in quinoline (7.5 mL) and a solution of imidazole (0.34 g, 5 mmol) in 3-methyl-1-butanol (MB, 7.5 mL) was added. The mixture was stirred at room temperature for 2 hours to give a heterogeneous violet mixture which was then placed into a Teflon-lined autoclave (23 mL). The autoclave was sealed and heated to 140° C. with increasing rate of 1° C./min, and held at 140° C. for 24 hours. After cooling at a rate of 0.1° C./min to room temperature, violet crystals with a structure depicted in FIG. 12d were collected and washed with ethanol.

Example 6

Procedure for preparing a sixth Co-containing metal organic framework material: $Co(Ac)_2 \cdot 4H_2O$ (0.623 g, 2.5 mmol) and a solution of imidazole (0.34 g, 5 mmol) in 3-methyl-1-butanol (MB, 15 mL) was added. The mixture was stirred at room temperature for 2 hours to give a heterogeneous violet mixture which was then placed into a Teflon-lined autoclave (23 mL). The autoclave was sealed and heated to 140° C. with increasing rate of 1° C./min, and held at for 140° C. for 24 hours. After cooling to room temperature at a rate of 0.1° C./min to room temperature, violet crystals with a structure depicted in FIG. 12e were collected and washed with ethanol.

Example 7

Procedure for preparing a seventh Co-containing metal organic framework material. $Co(Ac)_2 \cdot 4H_2O$ (0.623 g, 2.5 mmol) was dissolved in cyclohexanol (5 mL) and a solution of imidazole (0.34 g, 5 mmol) in cyclohexanol (10 mL) was added. The mixture was stirred at room temperature for 2 hours to give a heterogeneous violet mixture which was then placed into a Teflon-lined autoclave (23 mL). The autoclave was sealed and heated to 140° C. with increasing rate of 1° C./min, and held at 140° C. for 24 hours. After cooling at a rate of 0.1° C./min to room temperature, violet crystals were collected and washed with ethanol.

Example 8

Procedure for preparing of an eighth Co-containing metal organic framework material: $Co(Ac)_2 \cdot 4H_2O$ (2.491 g, 10 mmol) was dissolved in pyridine (30 mL) and a solution of 2-methylimidazole (1.642 g, 20 mmol) in 3-methyl-1-butanol (MB, 30 mL) was added. The mixture was stirred at room temperature for 2 hours to give a heterogeneous violet mixture which was then placed into a Teflon-lined autoclave (125 mL). The autoclave was sealed and heated to 140° C. with increasing rate of 1° C./min, and held at for 140° C. for 24 hours. After cooling at a rate of 0.1° C./min to room temperature, violet crystals with a structure depicted in FIG. 12a were collected and washed with ethanol.

Example 9

A Co-containing MOF material prepared according to the procedure as described in Example 1 was ground using a mortar and pestle until a fine powder was formed. The sample was subsequently thermally treated in a tubular reactor with a 1 inch quartz tube placed inside of a variable temperature furnace. About 15 mg of the ground sample was placed in a Coors boat inside the reactor tube and heat treated at a fixed temperature for 1 hour under an argon atmosphere at a constant flow rate of 100 mL/min.

A series of samples were thermally converted at various temperatures between 500 and 900° C. Product yield after the heat treatment was typically between 40 to 60%. After the thermal conversion, the sample was recovered and ground again to obtain finer particles. Samples were prepared with about 5 mg of the material added to a 10 mL vial. An ink was prepared using 5% Nafion solution and methanol as solvents. The prepared ink was magnetically stirred for several days until it became smooth and easy to deposit in a glassy carbon (GC) electrode. The prepared ink was used to test the electrocatalytic activity of the material using the rotating disk electrode (RDE) technique. The ink was deposited on the GC electrode using a micropipette, targeting a weight per unit area of 600 μg/cm$^2$ of the dry sample. The catalyst ink is tested using 0.1M $HClO_4$ or 0.5M $H_2SO_4$ aqueous solution as the electrolyte, an $Hg/Hg_2SO_4$ reference electrode with a 0.5M $H_2SO_4$ solution, and a gold counter electrode.

Figure 7:
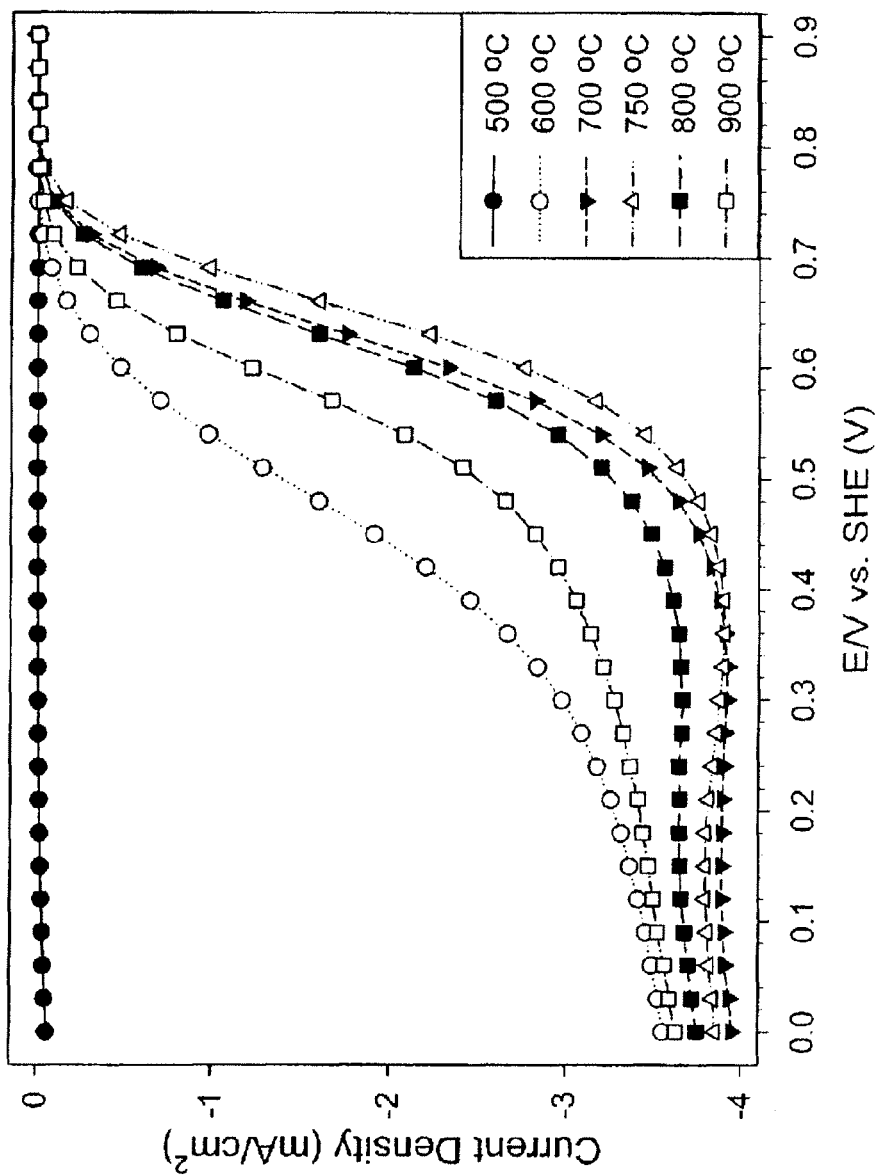
FIG. 7 is a plot of the current density as the function of polarization potential measured by rotating disk electrode method for various samples prepared according to Example 9.

The electrolyte was purged with Argon gas for at least 30 minutes, and the capacitive background current was first recorded in the potential sweep from −0.2 V to 0.98 V (vs. SHE) at the scan rate of 10 mV/second. The electrolyte was subsequently saturated by high purity oxygen for at least 30 minutes, followed by cathodic linear sweep voltammetry (CLSV) at the identical scan rate of 10 mV/second for ORR activity test. All the inks were tested at a rotation speed of 1600 rpm. The oxygen reduction polarization currents was corrected by subtracting the background current from that obtained from CLSV. FIG. 7 depicts the ORR activity as expressed by the rotating disk current density as the function of polarization potential for each of the samples pyrolyzed at the different temperatures.

Figure 15:
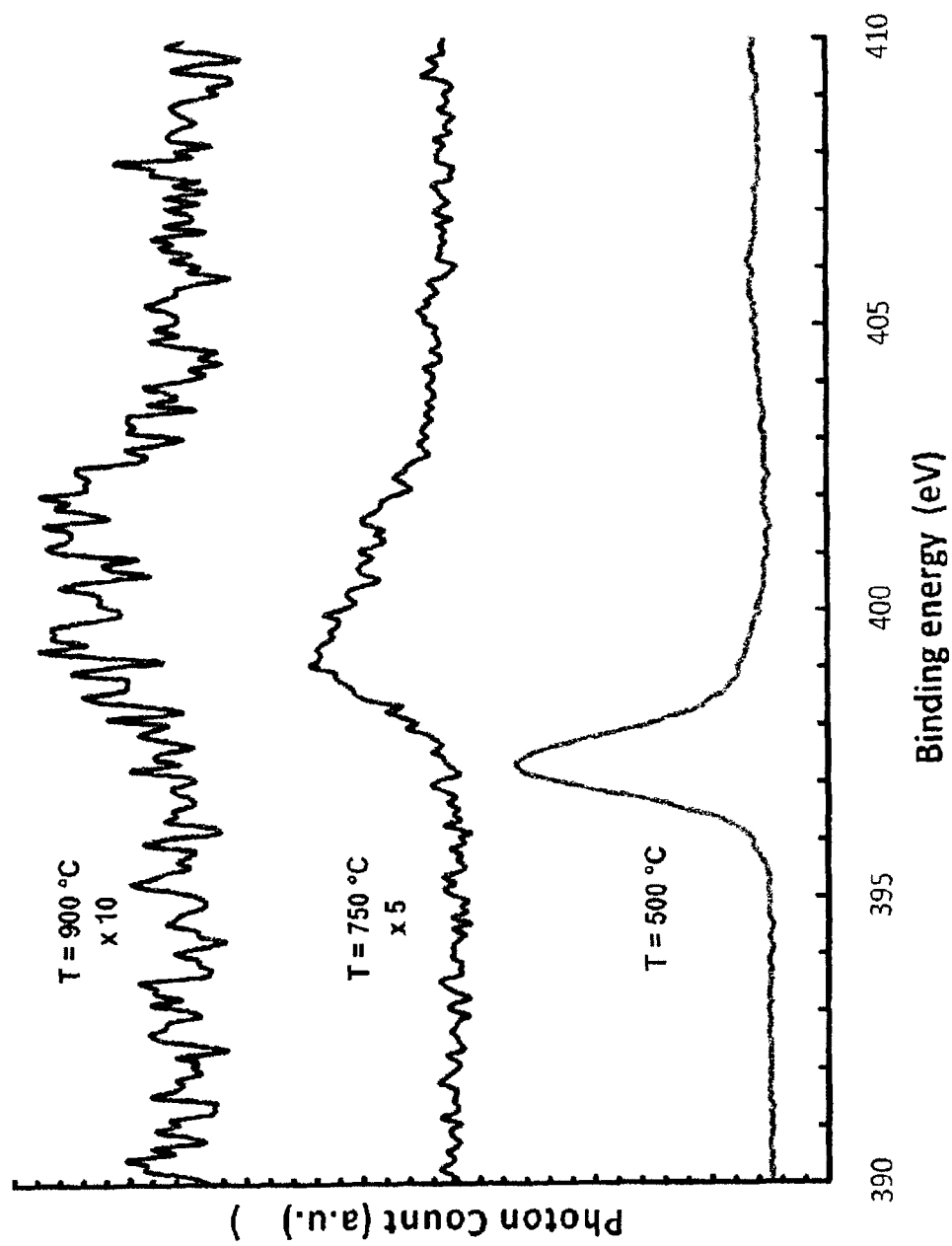
FIG. 15 is a plot of N X-ray photoemission spectroscopy (XPS) spectra obtained for a sample prepared according to Example 1 after heat-treatment at 500° C., 750° C. and 900° C.

An X-ray photoemission spectroscopy (XPS) study was carried out to characterize the transformation of key elements in the precursor during the heat-activation step. Shown in FIG. 15 is the N 1s XPS spectra taken for the sample prepared according Example 1 after thermal treatment at temperatures of 500° C., 750° C. and 900° C. Nitrogen remains mainly in the form of imidazolate with the N is binding energy at 397.3 eV after the 500° C. treatment. The nitrogen binding energy shifts significantly following treatment at 750° C., with two main peaks at 399.2 eV and 401.5 eV, and one minor feature at 405.3 eV, respectively. The first two peaks represent "pyridinic" and "pyrrolic" nitrogen in carbon and the third peak is attributed to nitrogen substituted into the interior, as opposed to the edges, of the graphene sheets. The relative peak intensities suggest that the majority of N is in a "pyridinic" form for the most active catalyst which is heat treated at 750° C. The intensities of "pyridinic" and "pyrrolic" nitrogen become closer after thermal activation at 900° C., although the overall N-content in the catalyst material decreases.

Example 10

Figure 8:
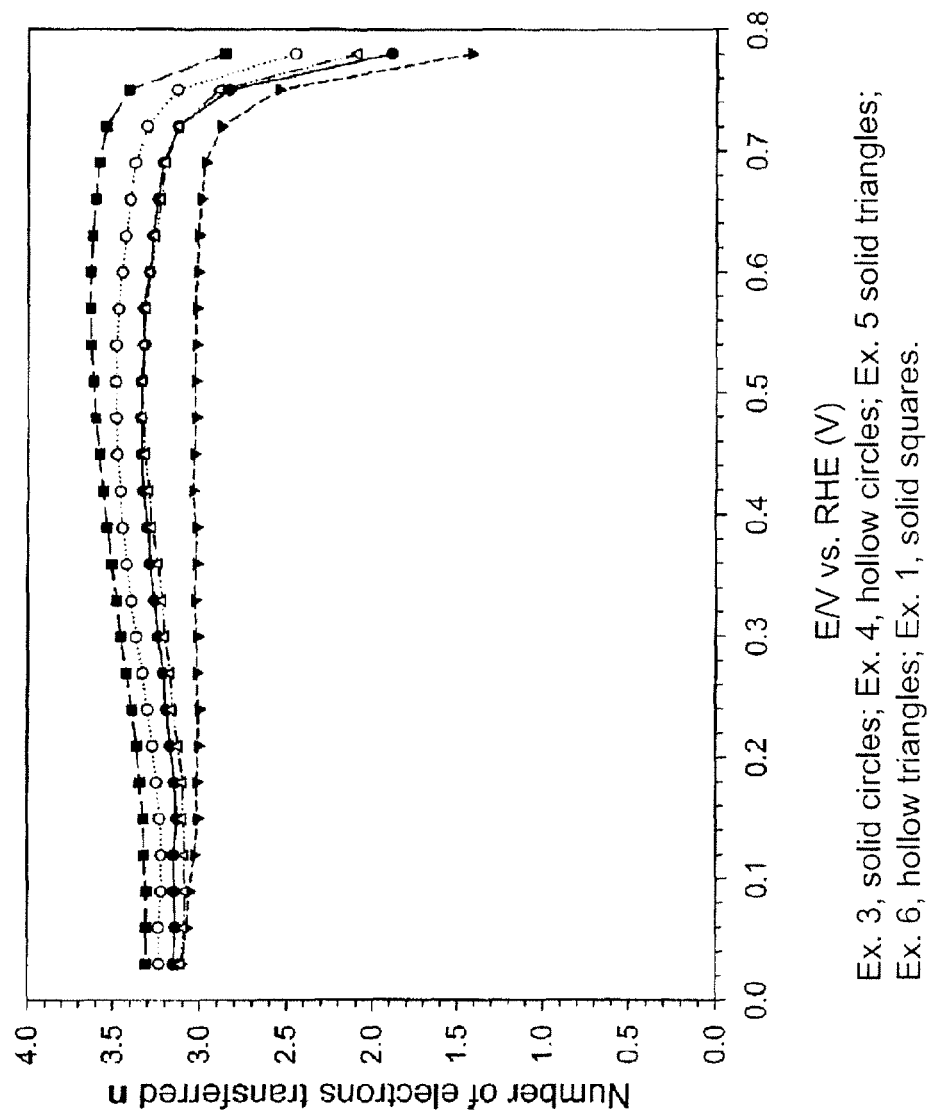
FIG. 8 is a plot of the electron transfer number as a function of electrode potential measured for the Co-containing MOF sample prepared according to Examples 1 and 3-6 and heat treated at 750° C. as described in Example 9.

A desirable characteristic of a non-PGM catalyst is the ability to reduce oxygen directly to water via the four electron transfer mechanism. Rotating ring disk electrode (RRDE) experiments give the number of electrons transferred during oxygen reduction, as a proportion between the disk current and the ring current, according to:

$$n = \frac{4I_d}{I_d + \frac{I_r}{N}}$$

Where n is the number of electrons transferred or selectivity, $I_d$ the disk current, $I_r$ the ring current and N the collection efficiency of the electrode. FIG. 8 shows the number of electrons transferred as a function of the electrode potential measured for a Co-containing MOF sample prepared according to the method of Example 1, 3, 4, 5 and 6 and heat treated at 750° C. as described in Example 9. The number of electrons transferred was generally found to be between 3 and 3.6.

Example 11

Figure 9:
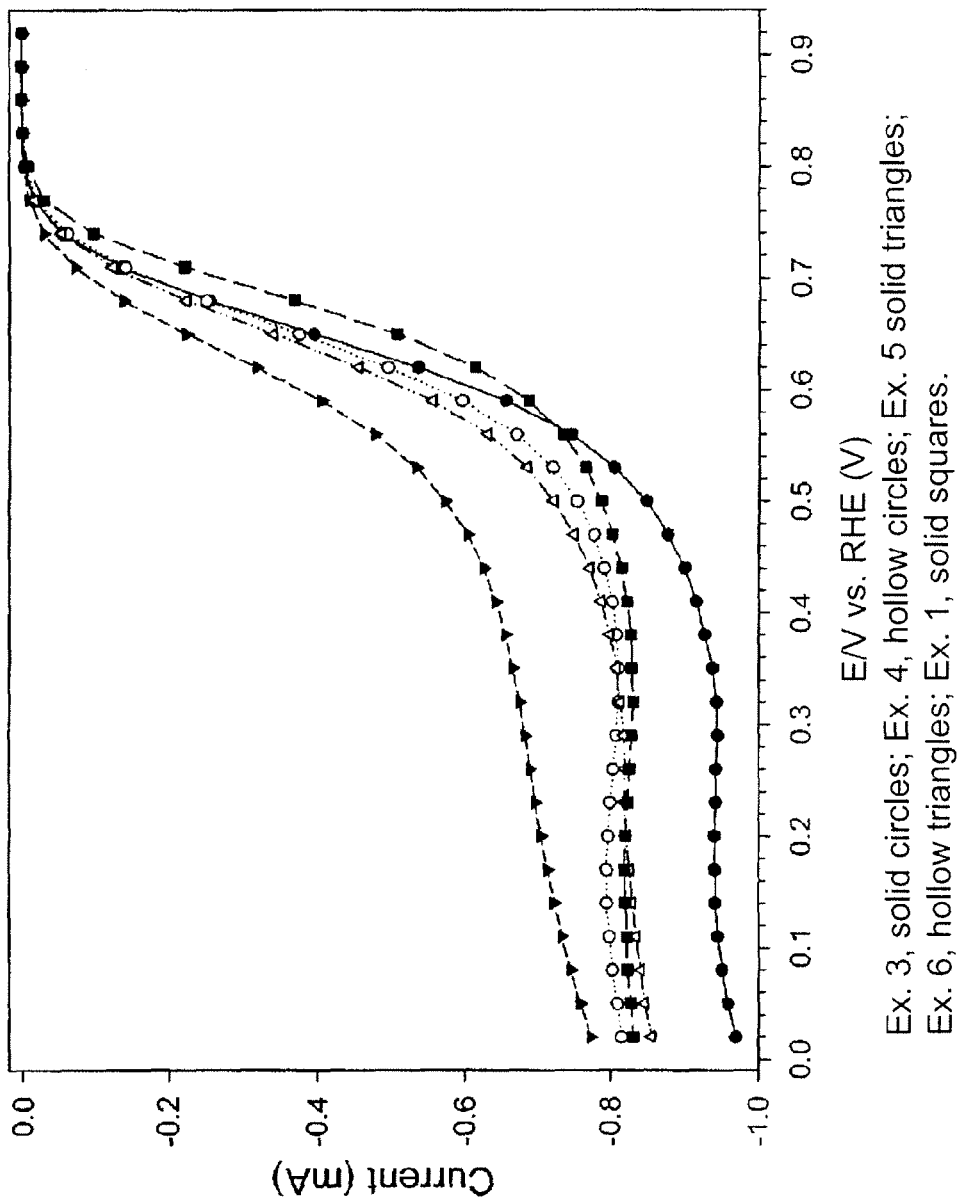
FIG. 9 is a plot of the current density as a function of polarization potential measured by rotating disk electrode method for a series of Co-containing MOF samples prepared according to Examples 1 and 3-6 and heat treated at 750° C.

The Co-containing MOF samples prepared according to the method described in Examples 1, 3, 4, 5 and 6 were heat treated at 750° C. and subsequently tested by the RDE method, following the same conditions as described in Example 9. FIG. 9 shows the ORR activity as expressed by the RDE current density as the function of polarization potential for these samples, demonstrating excellent ORR onset potentials and catalytic activities.

Example 12

Figure 10:
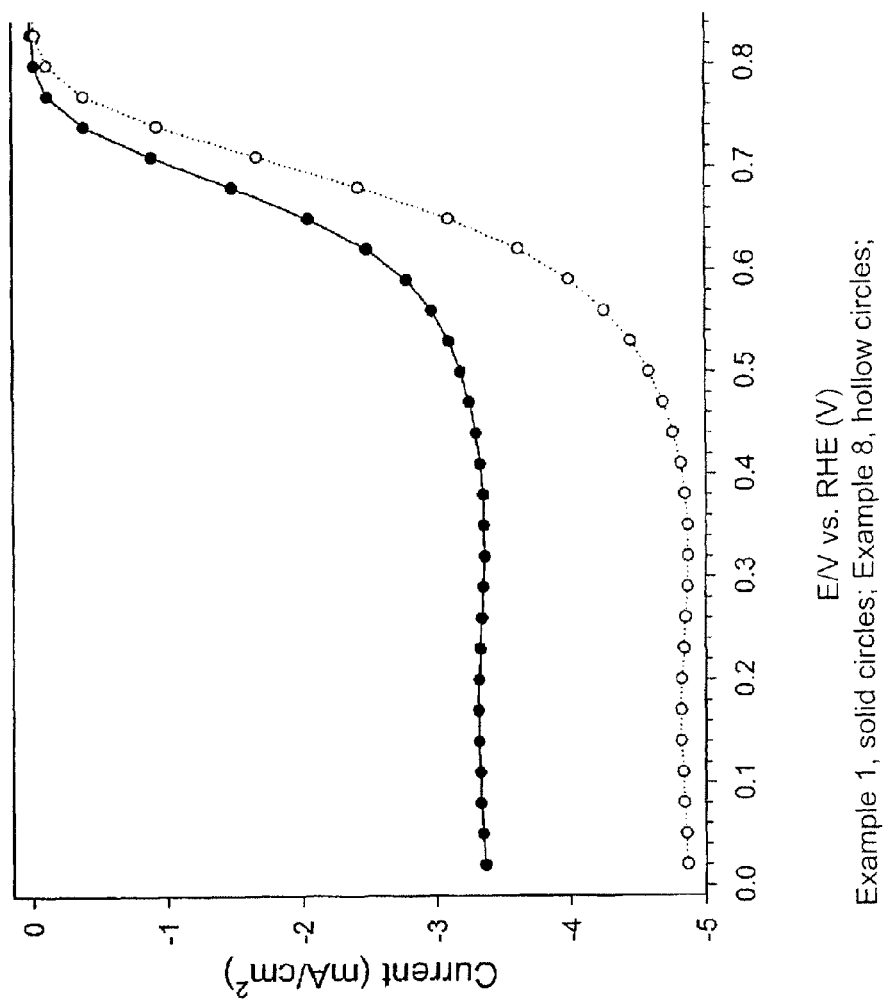
FIG. 10 is a plot of the current density as a function of polarization potential measured by rotating disk electrode method for Co-containing MOF samples prepared according to Example 1 and Example 8 and heat treated at 750° C.
Figure 11:
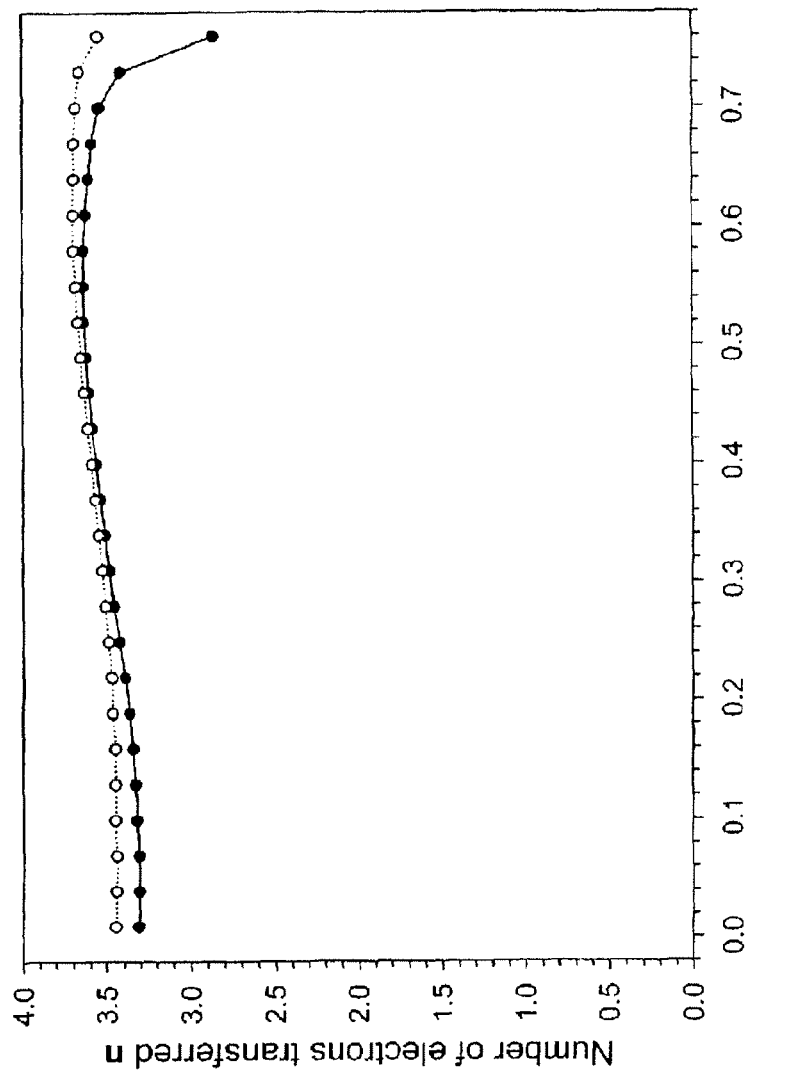
FIG. 11 is a plot of the electron transfer number as a function of electrode potential measured for Co-containing MOF samples prepared according to Example 1 and Example 8 after heat treatment at 750° C. as described according Example 9.

Co-containing MOF samples prepared according to the method described in Example 8 were heat treated at 750° C. and subsequently tested by the RDE method, following the same conditions as described in Example 9. The polarization curve generated from the RDE test was plotted with the results obtained from the sample of Example 1 following the same treatment and testing conditions. As can be seen from FIG. 10, the sample prepared according to Example 8 demonstrated improved ORR onset potential and catalytic activities. Furthermore, the electron transfer number at different potentials is also closer to 4, as is shown in FIG. 11.

Example 13

Figure 13:
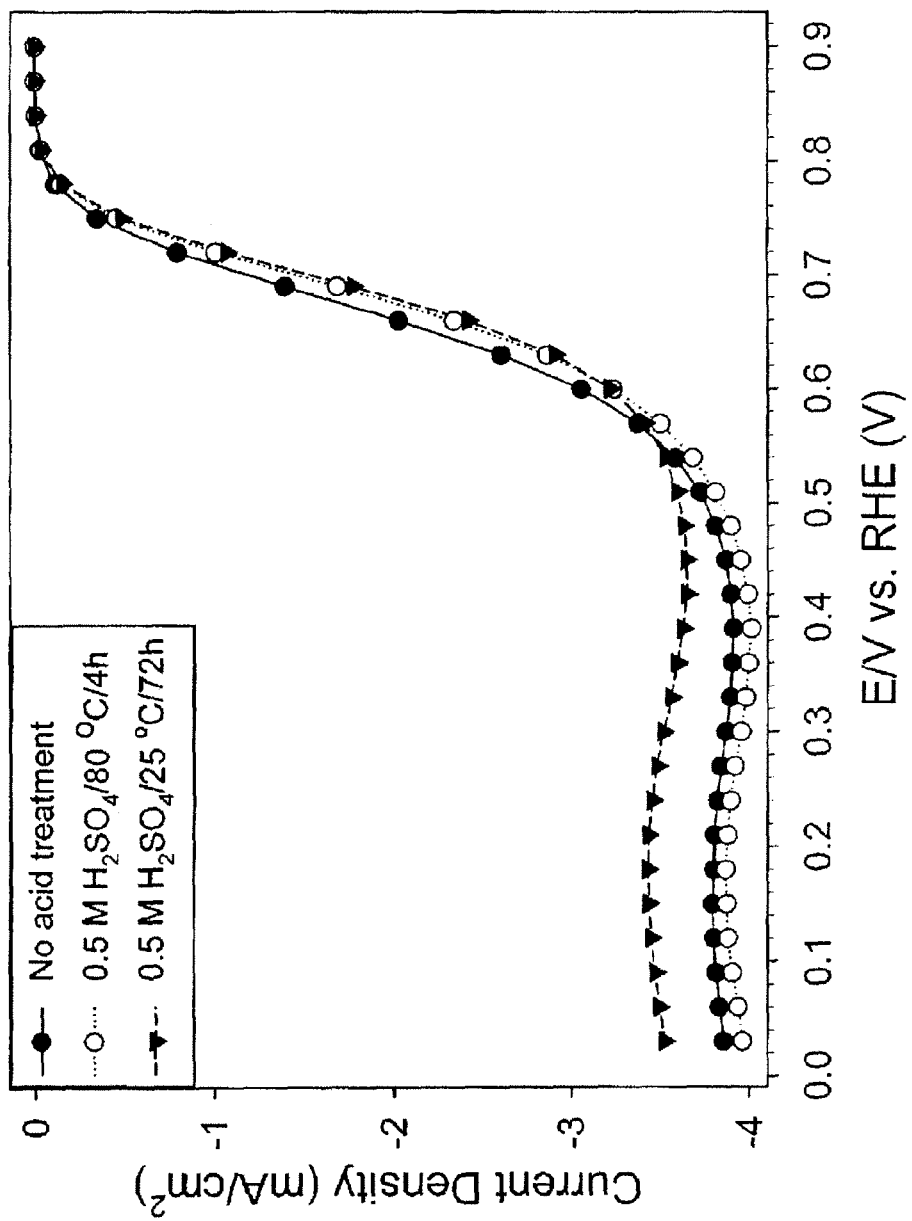
FIG. 13 is a plot of the current density as a function of polarization potential measured by rotating disk electrode method for a Co-containing MOF sample prepared according to Example 9 at 750° C., followed by various acid treatments.

A Co-containing MOF sample prepared according to the method described in Example 1 was pyrolyzed at 750° C. After the heat treatment, 15 mg of the sample was placed in two different vials. 10 mL of 0.5 M $H_2SO_4$ was added to each vial. One vial was left for 72 hours at room temperature and the second vial was heated and held at 80° C. for 4 hours. A post treatment acid wash was performed to remove excess metal in the sample, exposing hidden catalytic sites. Additionally, sulfuric acid assists to sulfonate the carbon, which enhances the mass transport properties of the catalyst. FIG. 13 depicts that current density as a function of polarization potential for the non-treated sample and the post treatment acid wash sample, which indicates an improved ORR onset potential.

The foregoing description of embodiments of the present invention have been presented for purposes of illustration and description. It is not intended to be exhaustive or to limit the present invention to the precise form disclosed, and modification and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of preparing a high surface area electrode catalyst free of platinum group metals (PGM) for use in a fuel cell, comprising:
   preparing a metal-organic framework (MOF) material consisting of a plurality of pores and also a non-PGM first transition metal catalytic center chemically bonded via a metal-nitrogen containing bond to an organic multidentate ligand in of the MOF material, the organic multidentate ligand and a first organic solvent contained within a portion of the plurality of pores, comprising:
      dissolving a first transition metal salt in the first organic solvent to form a metal salt solution, wherein the non-PGM transition metal in the transition metal salt is selected from the group consisting of: Co, Fe, Ni, Cr, Cu, Mn, Ta and W;
      dissolving the organic multidentate ligand in the first organic solvent to form a ligand solution;
      mixing a predetermined molar ratio of the metal salt solution and the ligand solution wherein the multidentate ligand is selected from the group consisting of imidazolate, pyrazolate, piperazine, tetrazolate, and combinations thereof into a reaction mixture; and
      forming the MOF material by the step consisting of chemically bonding the non-PGM transition metal to the organic multidentate ligand to form the MOF material through a chemical reaction of forming a metal-nitrogen containing bond to the organic multidentate ligand and then separating the MOF material from the reaction mixture;

substituting at least a portion of the contained first organic solvent with a second chemical moiety to enhance formation of electrocatalytic active sites in the MOF material; and thermally treating the MOF material for a predetermined period within an environment at a thermal conversion temperature to form the high surface area electrode catalyst having a plurality of uniformly distributed electrocatalytic active sites with catalytic centers arising from the non-PGM first transition metal chemically bonded in the thermally converted MOF material.

2. The method of claim 1, wherein the transition metal salt is selected from the group consisting of: a nitrate, an acetate, and a chloride of the transition metal.

3. The method of claim 1, wherein the second chemical moiety is dimensioned to infiltrate the plurality of pores and form a plurality of bimetallic electrocatalytic active sites, and wherein the second chemical moiety is one of an organometallic complex and a second metal salt.

4. The method of claim 1, wherein the first organic solvent is selected from the group consisting of: dimethylformamide (DMF), diethyformamide (DEF), dimethylacetamide (DMA), cynamide, and pyridine.

5. The method of claim 3, wherein the organometallic complex is selected from the group consisting of: ferrocene, cobaltocene, and Prussian blue; and wherein the second metal salt is selected from the group consisting of: a metal nitrate, a metal acetate, and a metal chloride.

6. The method of claim 1 further comprising dissolving at least one templating agent containing nitrogen with the first organic solvent to form the ligand solution.

7. The method of claim 1, wherein the predetermined period is between about 60 minutes and about 90 minutes, and wherein the thermal conversion temperature is between about 700° C. to about 800° C.

8. The method of claim 7, wherein the environment comprises one of an inert carrier gas and a reductive carrier gas, wherein the inert carrier gas is selected from the group consisting Ar, He and $N_2$, and wherein the reductive carrier gas is selected from the group consisting of: $NH_3$, pyridine, and acetonitrile.

9. The method of claim 1 further comprising subjecting the high surface area electrode catalyst to an acid washing process with an inorganic acid to remove a portion of the transition metal from the thermally converted MOF material, wherein the acid washing process improves the electrochemical activity of the high surface area electrode catalyst.

10. The method of claim 9 further comprising a secondary thermal treatment of the electrode catalyst in one of an inert carrier gas and a reductive carrier gas selected from the group consisting of: $NH_3$, pyridine, and acetonitrile following the acid washing process.

11. A method of preparing a nitrogen containing electrode catalyst free of precious group metals (PGM), comprising:

synthesizing a metal-organic framework (MOP) electrode catalyst precursor, the MOF electrode catalyst precursor consisting of a plurality of pores, a first non-PGM transition metal chemically bonded with a metal-nitrogen bond to the MOF electrode catalyst precursor, with a multidentate ligand containing nitrogen, and a first organic solvent disposed within the plurality of pores in the MOF electrode catalyst precursor;

wherein the multidentate ligand is selected from the group consisting of imidazolate, pyrazolate, piperazine, tetrazolate, and combinations thereof;

substituting at least a portion of the first organic solvent disposed within the plurality of pores in the MOF electrode catalyst precursor with one of a nitrogen-containing organic solvent and a second non-PGM transition metal; and thermally activating the MOF electrode catalyst precursor by an elevated temperature treatment to form a plurality of uniformly distributed electrocatalytic active sites.

12. The method of claim 11, wherein the second non-PGM transition metal is different from the first non-PGM transition metal.

13. The method of claim 11, wherein the nitrogen-containing organic solvent is selected from the group consisting of: dimethylformamide (DMF), diethyformamide (DEF), dimethylacetamide (DMA), cynamide, and pyridine.

14. The method of claim 11 further comprising incorporating the electrode catalyst into a membrane electrode assembly of a proton exchange membrane fuel cell.

15. The method of claim 11 further including a post treatment process comprising:

washing the electrode catalyst in an inorganic acid to remove a portion of the first non-PGM transition metal; and performing a secondary heat treatment on the electrode catalyst following the acid washing, wherein the post treatment process enhances the catalytic activity of the electrode catalyst.

\* \* \* \* \*